(12) United States Patent
Lindrose

(10) Patent No.: US 6,574,099 B2
(45) Date of Patent: Jun. 3, 2003

(54) DISC-DRIVE MOUNTING USING ADHESIVE FILMS

(75) Inventor: Albert Michael Lindrose, Boulder, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/862,163

(22) Filed: May 21, 2001

(65) Prior Publication Data

US 2001/0043459 A1 Nov. 22, 2001

Related U.S. Application Data

(60) Provisional application No. 60/205,931, filed on May 22, 2000.

(51) Int. Cl.[7] .................................................. H05K 5/02
(52) U.S. Cl. ...................... 361/685; 361/699; 360/137
(58) Field of Search ................................ 361/685, 724, 361/725, 686, 683–684, 699–709; 360/99.04–99.05, 137

(56) References Cited

U.S. PATENT DOCUMENTS

| 5,400,196 A | 3/1995 | Moser et al. ............ 360/97.02 |
| 5,596,483 A | 1/1997 | Wyler ....................... 361/683 |
| 5,666,239 A | 9/1997 | Pottebaum ............... 360/97.03 |
| 5,715,115 A * | 2/1998 | Takarasawa et al. ..... 360/99.05 |
| 5,761,184 A | 6/1998 | Dauber et al. ............. 369/247 |
| 5,777,821 A | 7/1998 | Pottebaum ............... 360/97.02 |
| 6,002,658 A * | 12/1999 | Aso et al. ................. 369/75.1 |
| 6,078,498 A | 6/2000 | Eckerd et al. ............. 361/685 |
| 6,164,614 A | 12/2000 | Lim et al. ................. 248/634 |
| 6,265,782 B1 * | 7/2001 | Yamamoto et al. ......... 257/783 |
| 6,388,873 B1 * | 5/2002 | Brooks et al. ............. 361/685 |

FOREIGN PATENT DOCUMENTS

EP    0 567 833 A    11/1993

OTHER PUBLICATIONS

"Evaluation System for Residual Vibration from HDD Mounting Mechanism" by Masaya Suwa and Keiji Aruga, IEEE Transactions on Magnetics, vol. 35, No. 2, Mar. 1999.

* cited by examiner

Primary Examiner—Darren Schuberg
Assistant Examiner—Hung Van Duong
(74) Attorney, Agent, or Firm—Merchant & Gould P.C.

(57) ABSTRACT

An apparatus and method for attaching a data storage device to a stationary planar support surface using an attachment member having a first side attached to the data storage device and a second side operable to attach to the stationary planar support surface. The attachment member is positioned about a center-of-mass of the data storage device so as to impede the rotation of the disc drive about the center-of-mass.

25 Claims, 5 Drawing Sheets

DISC-DRIVE MOUNTING USING ADHESIVE FILMS

RELATED APPLICATIONS

This application claims priority of U.S. provisional application Ser. No. 60/205,931, filed May 22, 2000.

FIELD OF THE INVENTION

This application relates generally to mounting data storage devices and more particularly to mounting a disc drive to a planar surface using a mounting means located about the center-of-mass of the disc drive.

BACKGROUND OF THE INVENTION

Disc drives are commonly used in workstations, personal computers, portables and other computer systems to store large amounts of data in a form that can be made readily available to a user. In general, a disc drive comprises one or more magnetic discs that are rotated by a spindle motor at a constant high speed. The surface of each disc is divided into a series of data tracks which are spaced radially from one another across a band having an inner diameter and an outer diameter. The data tracks extend circumferentially around the discs and store data in the form of magnetic flux transitions within the radial extent of the tracks on the disc surfaces. Typically, each data track is divided into a number of data sectors that store fixed size data blocks.

A head includes an interactive element such as a magnetic transducer which senses the magnetic transitions on a selected data track to read the data stored on the track, or to transmit an electrical signal that induces magnetic transitions on the selected data track to write data to the track. The head includes a read/write gap that positions the active elements of the head at a position suitable for interaction with the magnetic transitions on the data tracks of a disc as the disc rotates.

As is known in the art, each head is mounted to a rotary actuator arm and is selectively positionable by the actuator arm over a preselected data track of the disc to either read data from or write data to the preselected data track. The head includes a slider assembly having an air bearing surface that causes the head to fly over the data tracks of the disc surface due to fluid air currents caused by rotation of the disc.

Typically, several discs are stacked on top of each other and the surfaces of the stacked discs are accessed by the heads mounted on a complementary stack of actuator arms which comprise an actuator assembly, or "E-block." The E-block generally includes head wires which conduct electrical signals from the heads to a flex circuit, which in turn conducts the electrical signals to a printed circuit board (PCB) mounted to a disc drive base deck.

Control of the movement of the read/write heads from track to track on the disc surfaces is commonly accomplished through the use of a closed-loop servo system. Such servo systems typically make use of servo information recorded on the disc surfaces at the time of manufacture to obtain general information defining the specific track number and the sector position of the disc relative to the read/write head. When an access command is sent to the disc drive, a comparison is internally made between the current position of the read/write heads relative to the disc and the location at which the desired data transfer is to take place. If the read/write heads are currently positioned over the desired tracks, the disc drive simply waits for the correct circumferential location to rotate under the read/write heads, and begins the requested data transfer. If, however, the data transfer is to take place at a location other than the current position of the actuator, the servo logic determines both the distance and direction in which the actuator must move in order to bring the read/write heads to the target track. Based on this determination, the servo logic applies controlled direct current to the coil of the actuator voice coil motor (VCM), which causes the actuator to move from the current track location to the target track.

During such "track seeking" operations, the servo logic monitors the dynamic position of the actuator by reading the prerecorded servo data from the disc surfaces during the seek, and controls the current applied to the VCM in a manner to bring the read/write heads to rest at the target track.

A second function of the servo system is to maintain the read/write heads over the centerline of the target track, so that data transfers can be accomplished without inadvertently accessing adjacent tracks. This "track following" function is accomplished by constantly monitoring a position error signal (PES) which is proportional to the relationship of the read/write heads to the track centerline. That is, when the read/write heads are perfectly centered on the data track, the PES is zero, and no current is applied to the actuator VCM. Any tendency of the read/write heads to move away from the track centerline results in the generation of a PES with a polarity reflective of the direction in which the read/write head is displaced from the track centerline. The PES is then used by the servo system logic to generate a correction signal to move the read/write heads back toward the track centerline until such time as the PES is again zero, indicating that the read/write heads are again properly aligned with the data tracks.

One trend in the disc drive industry is to increase the capacities, or tracks per inch (TPI), of the disc drive while maintaining or reducing the physical sizes, or form factors, of the drive. As the TPI of a disc drive increases, accurately maintaining a head over a desired track becomes increasingly more difficult. As a result, disc drives are becoming increasingly sensitive to vibrations, such as self-excitation of rigid body vibration modes within the disc drive. Generally, the expectation in servo loop design is that both the rotation position actuator and the resultant position of the heads over a given track, as directed by the servo system, and the radial position of servo data within the track, as indicated by the PES, will ideally remain fixed in space. When undesirable linear motion along the plane of the discs and rotational motion of the disc drive base accompany the desired rotational motion of the actuator, the result shows up as "noise" on the PES. As such, the ability of the disc drive servo system to accurately track-follow is compromised in the presence of self-excitation of the disc drive.

Along with the general trend in the industry to provide ever decreasing form factors and ever increasing storage capacities in disc drives, there is also a trend to provide reductions in the level of acoustic emissions generated by disc drives.

Acoustic emissions from disc drives are typically generated from resonant vibrations induced in the disc drive top cover and base by self-excitation of the drive as described above. Additionally, self-excitation of rigid body vibration modes within the disc drive may be transmitted to, for example, the housing of the computer system in which the disc drive is mounted. This transmission typically occurs through brackets which mount the disc drive inside the computer housing. For example, the most common type of disc drive mount is by way of screws connecting the disc drive to a formed compartment or bracket made from sheet steel. As is typical, the screws are raised through holes in the bracket and attached to screw holes at locations around the periphery of the base of the disc drive. Unfortunately, mounting a disc drive in this manner provides a direct, metal-to-metal conduction path for noise and vibrations from the disc drive to be transferred to the housing of the computer.

Attempts have been made to isolate the noise made by disc drive self-excitation from the bracket, and thus the housing of the computer, typically by the use of grommet-like dampers placed along the screws between the disc drive and the bracket. However, results of this type of attachment have often been unsatisfactory. Furthermore, as these dampers can be characterized as springs, the spring-like attributes of the dampers often play a role in the actuator-induced self-excitation response of the disc drive.

A common problem encountered by disc drive manufacturers in designing mounting systems which produce disc drive self-excitation and the resulting noise is that disc drive manufacturers have only minimal-to-moderate control over how customers attach or mount drives. For example, some disc drive users use only a few of the screw positions to mount the disc drive, thus reducing the stability of disc drive mounts. Additional self-excitation problems occur when two or more drives are mounted in adjacent chassis locations. When this occurs, there is no assurance that these drives will be isolated in their dynamic mechanical behavior. This is especially true if one drive is, for example, seeking while the other disc drive is attempting to track follow. The combination of vibrations occurring in the two mounted drives can greatly exacerbate the vibration and noise problem discussed above.

Accordingly there is a need for an approach to mounting a disc drive which helps reduce rigid body vibrations within the disc drive and acoustical emission from the disc drive.

SUMMARY OF THE INVENTION

Against this backdrop embodiments of the present invention have been developed. Embodiments of the present invention include a method and apparatus for attaching a data storage device to a stationary planar support surface. In an embodiment of the present invention, an attachment member having first and second sides is attached, via the first side, to an outer planar surface of the data storage device. The attachment member is preferably attached to the outer planar surface such that it extends around or covers a center-of-mass of the disc drive. The second side of the attachment member may then be attached to the stationary planar support surface. In this manner, the disc drive is secured to the stationary planar surface in a manner which reduces or inhibits the rotation of the disc drive about the disc drive center-of-mass, thus reducing the affects of self-excitation in the disc drive.

In a further embodiment of the present invention, the attachment member is preferably annular in shape and formed of a polymeric viscoelastic damping material. In yet another embodiment of the present invention the attachment member preferably comprises an annular shaped polymeric viscoelastic double sided adhesive film positioned symmetrically about the center-of-mass of the disc drive.

These and various other features, as well as advantages, which characterize embodiments of the present invention, will be apparent from a reading of the following detailed description and a review of the associated drawings.

DETAILED DESCRIPTION

In general, the present disclosure describes methods and systems for mounting data storage devices. More particularly, the present disclosure describes mounting a data storage device to a planar surface, such as the interior of the housing of a computer, using viscoelastic damping material. More particularly still, the present disclosure describes mounting a disc drive to a planar surface via double sided viscoelastic tape centered symmetrically around a center-of-mass of a disc drive.

Figure 1:
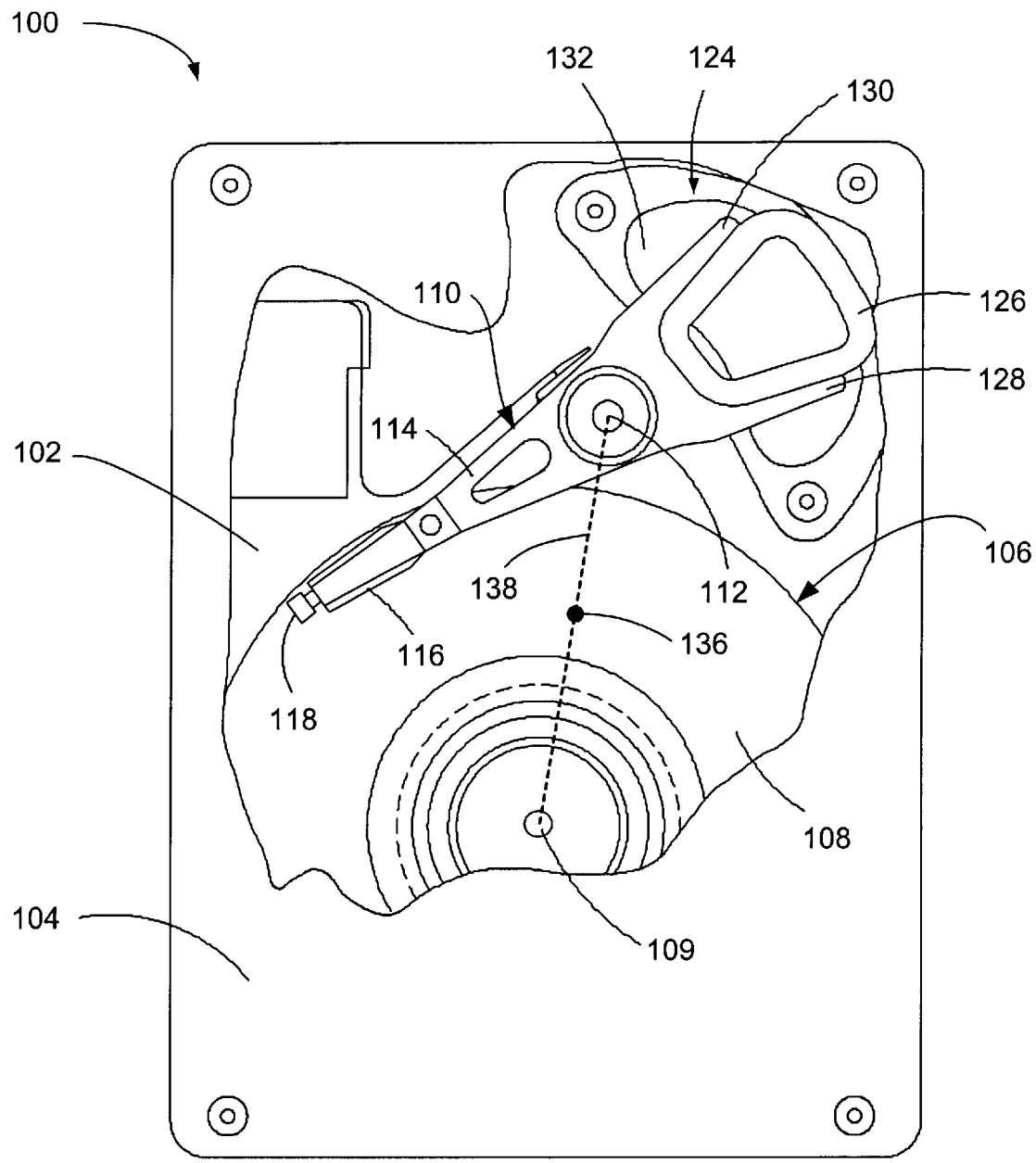
FIG. 1 is a plan view of a disc drive suited for use in the practice of the present invention.

The following is a description of an exemplary data storage device with respect to which the present invention may be employed. In particular, reference is made to practicing the present invention with respect to a disc drive system such as disc drive 100, as shown in FIG. 1. While the present invention is described herein with respect to its application in relation to a disc drive, it is to be understood that the present invention is not limited to its use with a disc drive. In this respect, the present invention may be used with a number of other data storage devices, such as optical drives or other non-disc drive data storage devices without departing from the scope of the present invention.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. As shown in FIG. 1, the internal components include a disc stack 106, comprising one or more discs 108 connected to a spindle hub 109. A spindle motor (not shown), connected to the spindle hub 109, rotates the disc stack 106 at a constant high speed about a stationary spindle shaft (not shown) attached to the base 102. Information is written to and read from tracks on the discs 108 through the use of an actuator assembly 110, which rotates during a seek operation about a bearing shaft assembly 112, attached to the base in a position adjacent the discs 108. The actuator assembly 110 includes a plurality of actuator arms 114 which extend toward the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

Connected to the actuator assembly 110, and positioned on the opposite side of the bearing shaft assembly 112, are a pair of coil support members 128 and 130. Attached between the coil support members 128 and 130 is a coil 126. The coil 126, together with one or more permanent magnets 132 affixed to the drive base 102 and positioned above and/or below the coil 126, forms a voice coil motor (VCM) 124.

During a seek operation, the track position of the heads 118 is controlled through the use of the voice coil motor (VCM) 124. The two coil support members 128 and 130 of the VCM 124 work in conjunction with vertically-directed magnetic fields originating from the permanent magnets 132. When electrical current is passed through the coil 126, the current generates a circumferentially directed force (relative to the bearing shaft assembly 112 and in a plane parallel with the discs 108) in each coil support member 128 and 130 of the actuator assembly 110 as a result of the interaction of the current with the magnetic fields. The forces generated in the coil support members 128 and 130 have the same rotational sense. That is, the effective points of application of the two forces in the coil support members 128 and 130 are at the same radius from the bearing shaft assembly 112. The sum of these forces acting at their effective radius from the bearing shaft assembly 112 generate the torque needed to rotate the actuator assembly 110 about the bearing shaft assembly 112. By varying the magnitude and polarity of the current with time, the actuator assembly 110, and thus the heads 118, may be directed to a desired angular position over the discs 108.

As discussed above, self-excitation of rigid body mode vibrations in the disc drive causes a number of vibrational problems in the drive. These self-excitations typically occur in two ways: actuator self-excitation and spin motor excitation.

In typical designs, the geometry of the actuator assembly is such that the radial components of the forces in the coil support members 128 and 130 cancel each other out. As such, the remaining circumferential force components in the coil support members 128 and 130 can be summed with the result that there is a single net force acting circumferentially at the coil 126. From a mechanics perspective, this one force conceptually can be given a parallel "translation" to the bearing shaft assembly 112 as long as a couple (moment) is also introduced. Thus the applied forces and moments acting on the actuator assembly 110 are effectively a force and moment applied at the bearing shaft assembly 112. The force coming from the bearing shaft assembly 112 connected to the base 102 is the only reaction that is applied to the actuator assembly 110. The applied and reaction forces are in balance unless there is a significant motion (linear acceleration) of the pivot point arising from base 102 motion. On the other hand, because of the ball bearings in the bearing shaft assembly 112, there is no reaction torque to balance the applied moment; hence, depending on the actuator inertia, the actuator assembly 110 will experience a rotary acceleration.

Considering the base 102 alone, the only excitation directly attributable to the VCM 124 is the shaft reaction force applied at the bearing shaft assembly 112. There is no moment being applied to the base 102 at the bearing shaft assembly 112. However, another factor must be considered. Specifically, the design of the VCM 124 dictates that in-plane reaction forces develop within the permanent magnets 132. The net force applied to the permanent magnets 132 is equal in magnitude, but opposite in direction to the direction of the net force being applied to the coil 126.

Since the force at the point of connection of the bearing shaft assembly 112 to the base 102 and the force in the permanent magnets 132 are equal in magnitude but opposite in direction to one another, the two forces together constitute a couple. This couple is the only base excitation resulting from operations involving movement of the actuator assembly 110. The magnitude of this couple is approximately equal to $K_t \times I(t)$ where $K_t$ is the torque constant of the voice coil motor and $I(t)$ is the time-dependent current applied to the voice coil. It is significant that the frequency content of the couple will be the same as the frequency content of the current waveforms being applied to the coil 126, as the magnitude of the couple will depend on the amplitude of the current waveforms applied to the coil 126.

Figure 3:
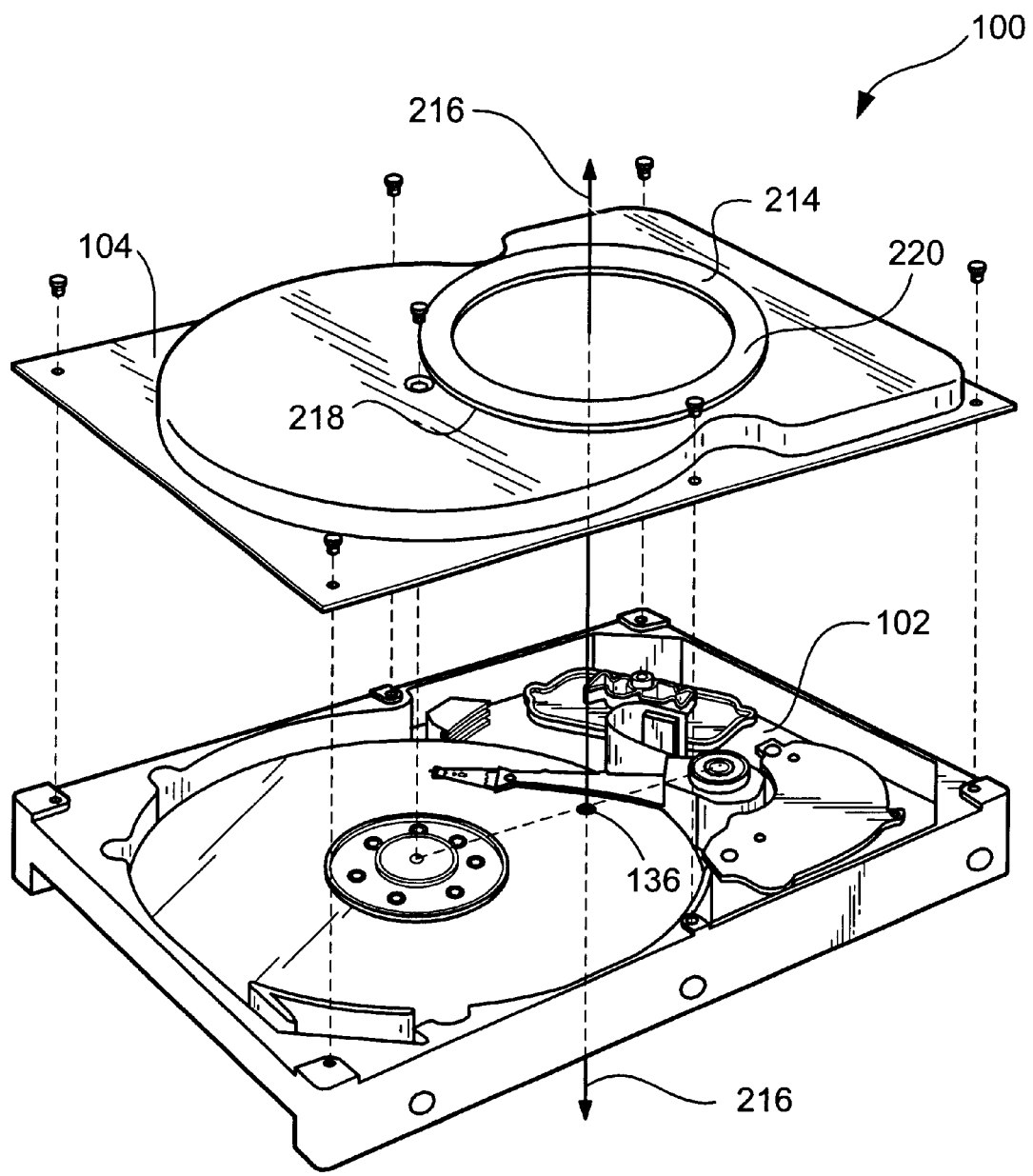
FIG. 3 is an exploded view of the disc drive shown in FIG. 2 illustrating the placement of an attachment member in accordance with a preferred embodiment of the present invention.

Since the force at the point of connection of the bearing shaft assembly 112 to the base 102 and the force in the permanent magnets 132 form a couple, VCM 124 excitation tends to rotate the base 102 in an inertial reference frame about the center-of-mass of the disc drive 100. Typically, the center-of-mass 136 of a disc drive is located approximately midway on a line 138 drawn between the center of the bearing shaft assembly 112 and the rotational center of the spindle motor, as shown in FIG. 1. As shown in FIG. 3, the center-of-mass 136 defines a mass axis 216 which extends from the center-of-mass 136. As also shown in FIG. 3, the mass axis 216 extends in parallel relation to a rotational axis of the discs 108 of the disc drive 100 and in a perpendicular relation to the top cover 104.

Figure 2:
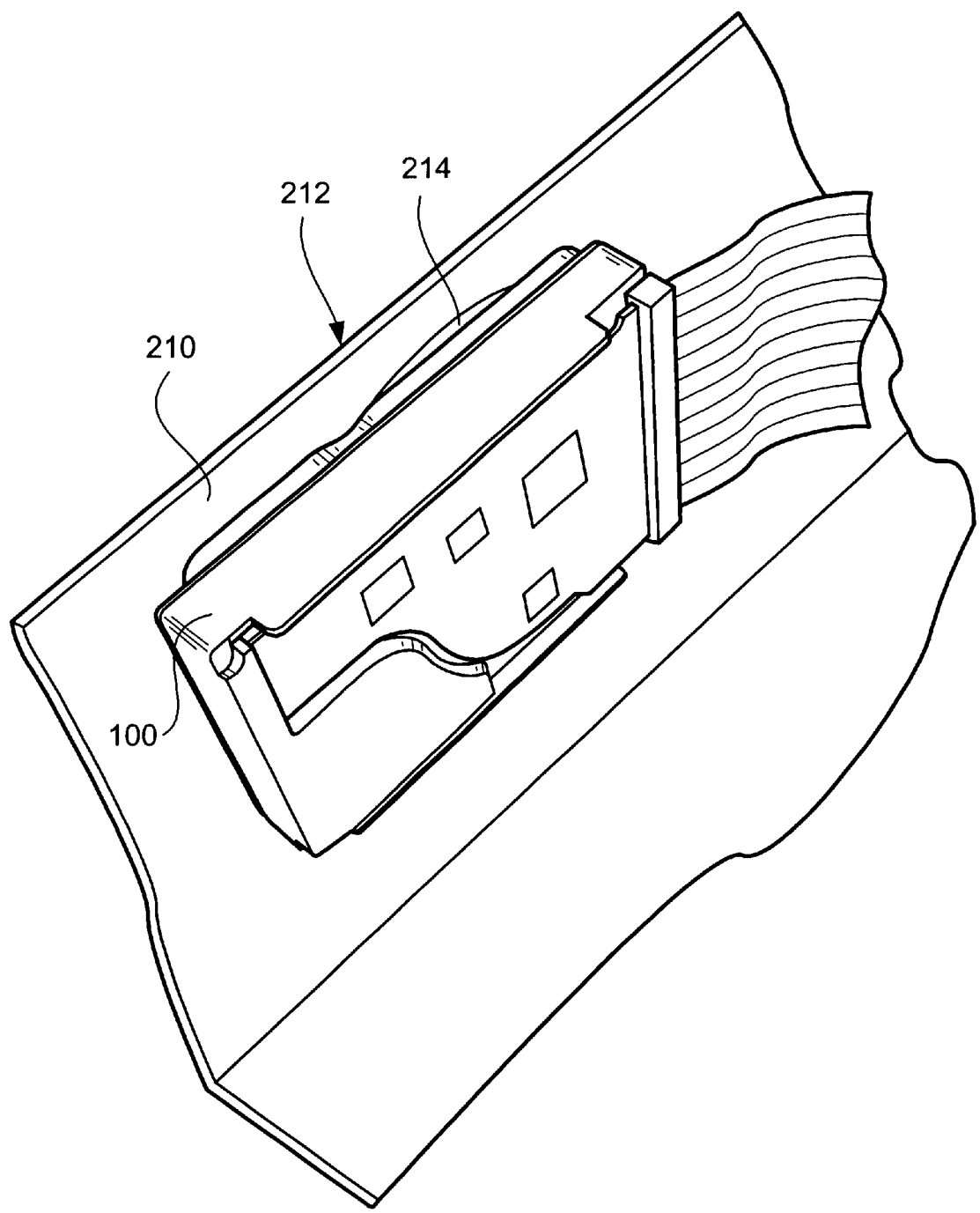
FIG. 2 is a perspective view of the disc drive shown in FIG. 1 attached to a stationary planar support surface via an attachment in accordance with an embodiment of the present invention.

Base rotation is impeded by the rotary inertia of the entire disc drive 100. With current typical 3.5 inch hard disc drives, including the circuit board, this inertia (Izz @cg) has a value of about 0.010 inch×lb×sec². Base rotation is also constrained by the number, type, and position of attachments that are used to fasten the disc drive to a chassis. In typical disc drives, there are nine different, multidirectional screw holes drilled and tapped at locations around the periphery of the base 102 for use with these chassis, as shown in FIG. 2. In typical disc drives, these screws connect the drive to a formed compartment within a computer chassis made from sheet steel approximately 0.045" thick.

The second type of disc drive self-excitation, spin motor excitation, typically results from residual imbalance of the spindle motor/disc stack caused by the center-of-mass of the disc stack 106 not being perfectly positioned on the spin axis of the discs 108. Mechanically, this imbalance acts like a force vector applied at the disc spin axis and rotating at the spin speed of the disc stack 106. The magnitude of this imbalance is proportional to the mass of the rotating stack 106, the distance the center-of-mass of the stack 106 is off the spin axis, and the spin speed squared. As discussed above, the imbalance force vector can be "translated" to the center-of-mass 136 of the disc drive if a couple is also introduced. The force vector applied to the center-of-mass of the stack 106 can be broken into x and y harmonic components along the plane of the discs, 90 degrees out of phase, each varying in time at the spin frequency. These two force components, working through the overall mass of the disc drive 100, tend to produce harmonic linear accelerations of the disc drive 100 in the x and y directions at the spin frequency. The imbalance couple tends to produce a harmonic rotation of the disc drive 100 about its center-of-mass 136. If self-excitation caused by disc stack 106 occurs simultaneously with self-excitation caused by the VCM 124, the two excitations will add together to create a complex rotational self-excitation time history about the center-of-mass of the disc drive 100.

One of the ways in which the harmonic rotation of the disc drive 100 about its center-of-mass 136 may be limited is by increasing the rotary inertia of the entire disc drive 100.

However, it will be understood that since the trend in the disc drive industry is to produce smaller, lighter weight drives, this is not a viable option, particularly in small form factor disc drives.

Base rotation may also be constrained by firmly securing the disc drive 100 in a reliable manner that prevents or limits the rotation of the drive about its center-of-mass. As such, and as described hereinafter, various embodiments of the present invention are directed to reliably securing a disc drive within its operating environment in a manner which limits the rotation of the drive about its center-of-mass.

Turning now to FIG. 2, one embodiment of the present invention generally relates to mounting a data storage device, such as disc drive 100, to a stationary planar surface 210, such as an interior wall of a computer housing 212. As also shown in FIG. 2, the disc drive 100 is preferably fastened to the planar surface 210 in the computer housing 212 via an attachment member 214 positioned between the disc drive 100 and the stationary planar surface 210, wherein the disc drive is attached to a first side 218 of the attachment member(s) 214 and a second side 220 of the attachment member is in turn attached to the stationary planar surface 210.

Attaching the disc drive 100 to the attachment member, and the attachment member to the stationary planar surface 210, may be accomplished in a number of ways. For example, the attachment member 214 may be attached to the disc drive 100 via an adhesive. Similarly, the attachment member 214 may then be attached to the planar surface 210 via an adhesive. Alternatively, the attachment member may be attached to the disc drive 100 and/or the stationary planar surface 210 via Velcro. However, as described in greater detail below, in a preferred embodiment, the attachment member 214 comprises a double sided adhesive tape.

As shown in FIG. 3, the attachment member 214 is preferably positioned on the top cover 104 of the disc drive 100, such that the attachment member 214 covers or surrounds the mass axis 216. As also shown in FIG. 3, the attachment member 214 preferably comprises an annular ring positioned coaxially around the mass axis 216 of the center-of-mass 136 of the disc drive 100. The annular shape of the attachment member 214 allows the rotational self-excitation forces of the disc drive 100 to be equally distributed in the attachment member 214, thus limiting the rotation of the disc drive 100 about its center-of-mass 136.

Figure 6:
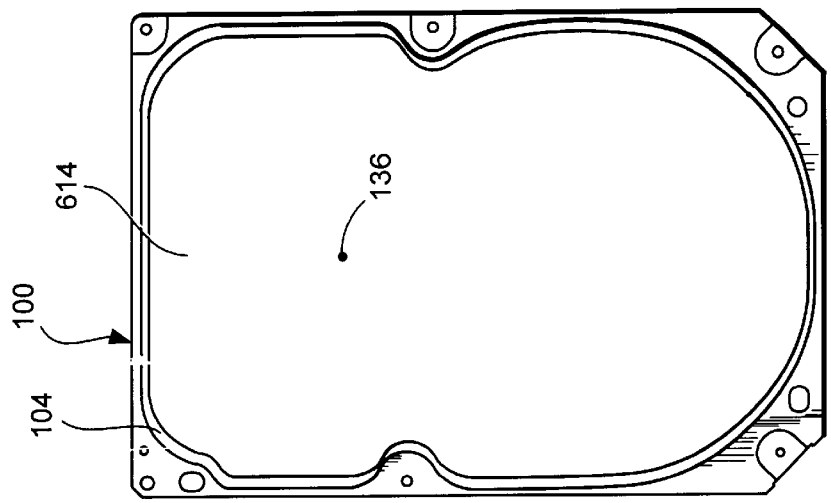
FIGS. 4, 5, and 6 are top plan views of the disc drive shown in FIG. 2 illustrating alternative shapes of the attachment member.
Figure 5:
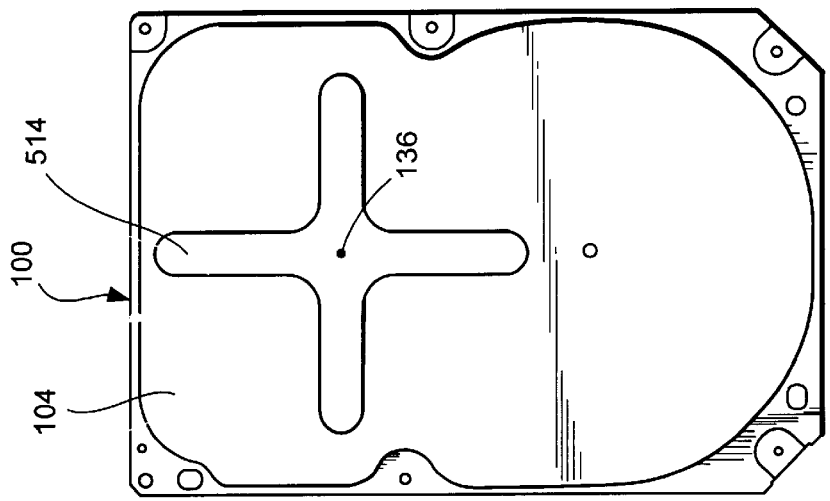
Figure 4:
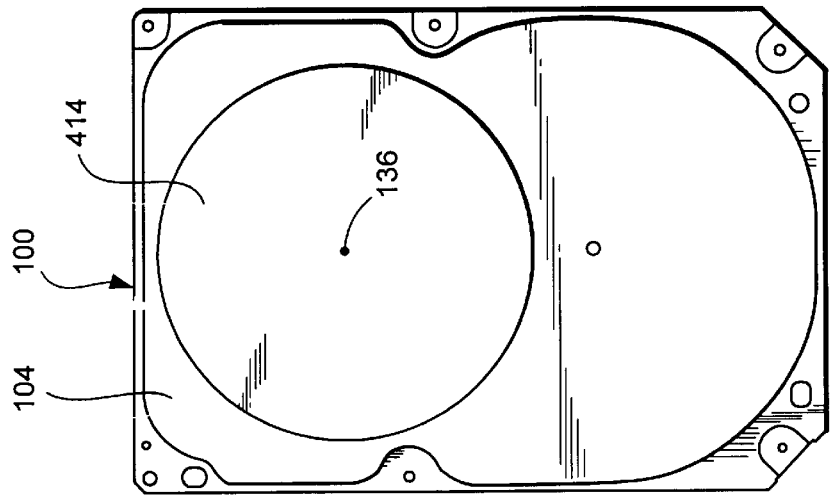

While the attachment member 214 is shown in FIG. 3 as being annular in shape, it is to be understood that a number of alternatively shaped attachment members 214 may be used. For example, in an alternative embodiment an attachment member 414 may be circular or disc shaped, as shown in FIG. 4. As with the annular shaped attachment member 214, a disc shaped attachment member 414 provides for an equal distribution of rotational self-excitation forces of the disc drive 100 with the attachment member 214. Other examples of possible attachment member shapes include cross-shaped attachment member 514, as shown in FIG. 5, or an attachment member 614 shaped to conform to the entirety of top cover 104, as shown in FIG. 6. Furthermore, the attachment member 214 may take the form of a number of individual attachment members spaced about the center-of-mass 136 of the disc drive. Regardless of the shape or number of attachment member 214 or members used, it is preferable that the mass axis 216 of the center-of-mass 136 of the disc drive 100 is located within the domain or outer circumference of the attachment member 214 or members. In this way, the rotational self-excitation forces of the disc drive 100 will be equally distributed in the attachment member 214. By adjusting the outer diameter of the attachment member(s) 214, the amount and character of the forces absorbed may be modified or adjusted.

Regardless of the shape of the attachment member(s) 214, if the attachment member(s) 214 is applied over a large portion of the top cover, the process of bonding the disc drive to the stationary planar surface 210 drive will create a constrained-layer system equivalent to constrained-layers typically used in disc drives for acoustic damping. As such, the need for a discrete, constrained-layer damper part would disappear, while the acoustic attenuation effect of the constrained-layer damper would be retained, thus providing for significant savings in cost of the disc drive 100.

In a preferred embodiment of the present invention, the attachment member 214 is composed of polymeric viscoelastic damping material. As will be clear to those skilled in the art, the stiffness and damping characteristics of the polymeric viscoelastic damping material contribute to effectively impede the rotation of the disc drive 100 about its center-of-mass through a shearing action. Additionally, linear motion of the drive in the plane parallel with the discs 108 will also be subjected to the same shearing action and will also be limited. As will also be clear to those skilled in the art, various polymeric compounds could be selected for the attachment member 214 depending on the primary objectives being sought. Among these objectives might be dynamic performance of the disc drive 100 over certain frequencies, ease of disc drive 100 removal and/or replacement from the planar surface 310, handling and cleanliness issues, as well as environmental factors, etc.

In a preferred embodiment of the present invention, the attachment member 214 comprises a polymeric viscoelastic double sided adhesive film of approximately 0.001" to 0.050" in thickness. In this embodiment of the invention, one side of the attachment member 214 is secured to the top cover 104 of the disc drive 100 at some time in the manufacturing process of the disc drive 100. A thin, removable non-adhesive film (not shown) would then cover the side of the attachment member 214 facing away from the top cover 104. As such, when the purchaser or eventual user of the disc drive 100 wishes to mount the disc drive 100 to the stationary planar surface 210, the non-adhesive film would simply be removed from the attachment member 214 and the exposed adhesive side of the attachment member 214 would be pressed into contact with the stationary planar surface 210. For example, a disc drive or drives could be mounted to the stationary planar surface 210 in the computer housing 212, wherein the planar surface comprises one of the computer housing walls or a flat sheet metal plate positioned within the computer housing 212. Due to its high in-plane stiffness, a flat sheet metal plate would offer a very rigid foundation for disc drive mounting as compared to the folded metal brackets typically used to mount disc drives. In addition to the benefit of increased rigidity in disc drive mounting, use of the present invention in such a manner eliminates the need and expense of the special mounting brackets. Furthermore, multiple disc drives could be placed side-by-side or on opposite sides of the stationary planar surface 210 of the flat sheet metal plate.

Figure 7:
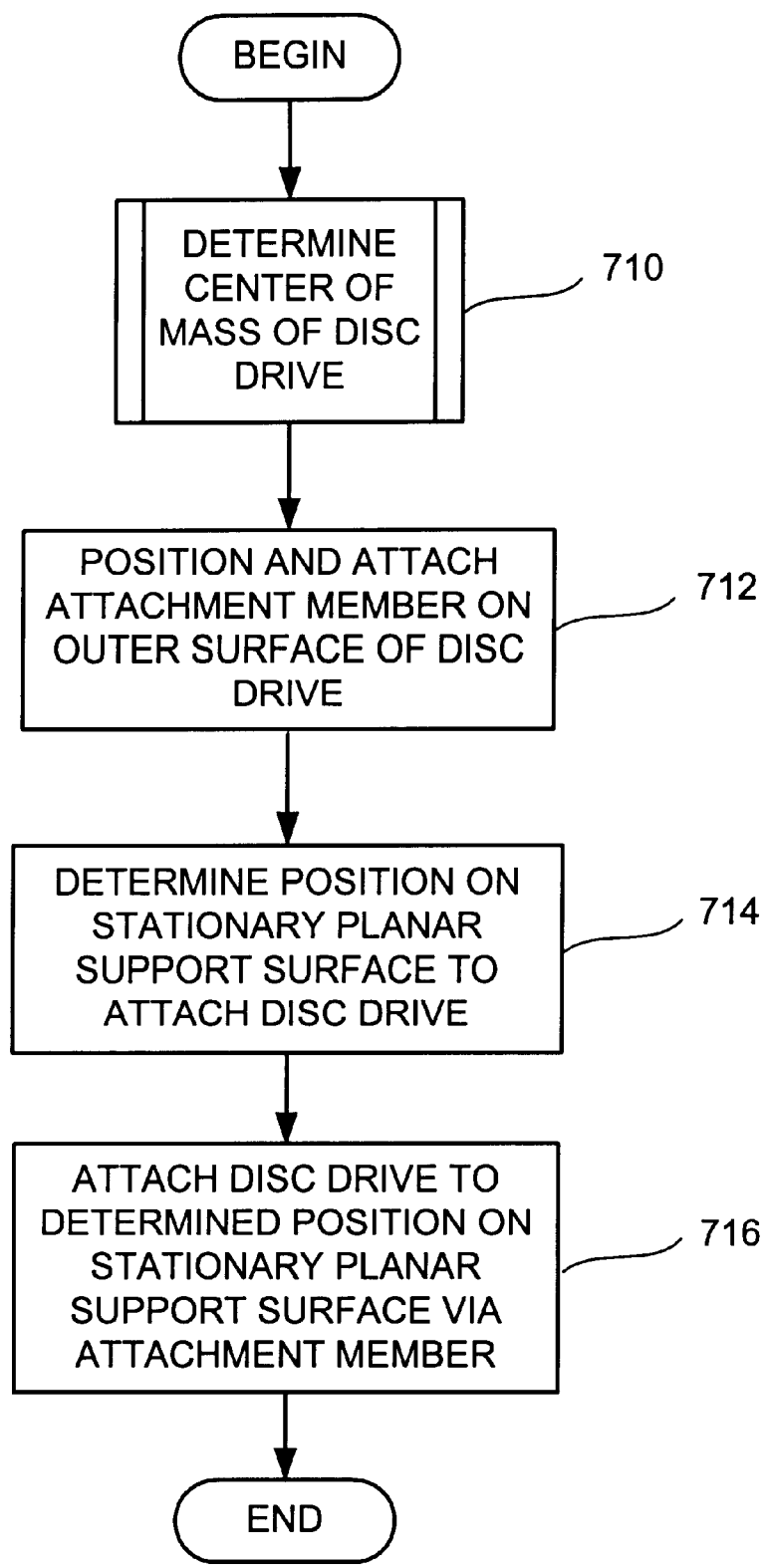
FIG. 7 is a flowchart illustrating general steps performed in the practice of an embodiment of the present invention.

As shown in FIG. 7, a preferred method of attaching the disc drive 100 to the stationary planar support surface begins with the step of determining 710 the center-of-mass 136 of the disc drive 100. Determination of the center-of-mass 136 of the disc drive 100 may be accomplished by any number of well known methods. For example, the center-of-mass 136 may be determined experimentally by suspending the disc drive 100 from two different points on the drive. Using this method, the disc drive 100 would be suspended from a first point on the drive and a line would be drawn (which could be established by a plum bob) when the drive is in equilibrium. The disc drive 100 would then be suspended from a second point on the drive, and a second line would be drawn in similar manner to the first line. The center-of-mass 136 of the disc drive 100 would then correspond to the intersection of the first and second lines.

After the center-of-mass 136 of the disc drive 100 has been established, the attachment member 214 is then positioned and attached to an outer surface of the disc drive 100 in attachment step 712. Preferably, the attachment member 214 is attached to the top cover 104 of the disc drive 100, such that the attachment member 214 is centered about the mass axis 216. Stated another way, the attachment member 214 is preferably positioned and attached to the top cover 104 such that the mass axis 216 passes through the attachment member 214. As described above, the attachment member 214 is preferably attached to the top cover 104 via an adhesive.

Next, in determination step 714, the appropriate position is determined for attachment of the disc drive 100 to the stationary planar surface 210, such as the inner wall of the computer housing 212, as shown in FIG. 2. Once the position on the stationary planar surface has been determined, planar surface 210 is preferably thoroughly cleaned of debris and lubricant so that a good bond may be achieved between attachment member 214 and the stationary planar surface 210.

Finally, in attachment step 710, the disc drive 100 is attached to the stationary planar support surface 210 via the attachment member 214. As described above, the attachment member 214, and thus the disc drive 100, is preferably attached to the stationary planar support surface 210 via an adhesive.

The present invention offers a simplified mounting technique while at the same time giving improved dynamic performance to the disc drive on which it is employed. A further advantage is the attendant cost savings the present invention provides over conventional disc drive mounting techniques. The cost savings provided by the present invention result from, among other things, the elimination of drilling and tapping holes in the disc drive, the elimination of attachment screws, the elimination of constrained-layer acoustic damping plates, and the elimination of the need for mounting brackets.

In summary, in view of the foregoing discussion it will be understood that one embodiment of the present invention comprises an apparatus for attaching a data storage device (such as 100) to a stationary planar support surface (such as 210). In this embodiment, the data storage device preferably has an outer housing with an outer planar surface (such as 104) and a storage medium (such as 108) within the housing rotating about a rotational axis (such as 109). The data storage device has a center-of-mass (such as 136) which has a mass axis (such as 216) parallel to the rotational axis and extending through the outer planar surface of the storage device. Also preferably included in this embodiment of the present invention is an attachment member (such as 214) having a first surface (such as 218) which is attached to the outer planar surface of the data storage device and which extends around the mass axis and a second surface (such as 220) for fastening to the stationary planar surface.

Preferably, the attachment member in this embodiment of the present invention is positioned symmetrically around the mass axis (such as 214, 414, 514, or 614). For example, the attachment member (such as 218 or 414) may have a circular outer circumference positioned substantially symmetrically about the mass axis. Additionally, the attachment member (such as 214) may have an annular shape having an outer circumference positioned substantially symmetrically about the mass axis.

The attachment member preferably comprises a damping material having viscoelastic properties. For example, the attachment member may comprise a viscoelastic tape, such as polymeric viscoelastic double sided adhesive film. Preferably, the first surface (such as 218) of the attachment member is adhesively attached to the outer planar surface of the data storage device. Preferably, the data storage device is a disc drive (such as 100) and the stationary planar support surface is a computer housing (such as 212).

Another embodiment of the present invention relates to a method for securing a data storage device (such as 100) to a stationary planar support surface (such as 210) using an attachment member (such as 214) having a first adhesive surface (such as 218) and a second adhesive surface (such as 220). In this second embodiment of the present invention, the data storage device preferably has an outer housing having an outer planar surface (such as 104) and a storage medium (such as 108) within the housing rotating about a rotational axis (such as 109). The storage device in this embodiment of the present invention preferably has a center-of-mass (such as 136) in the housing having a mass axis (such as 216) which is parallel to the rotational axis and extends through the outer planar surface.

The method of this embodiment of the present invention preferably includes the steps of determining the center-of-mass of the data storage device (such as 710), attaching the first adhesive surface of the attachment member to the outer planar surface of the data storage device such that the attachment member extends around the mass axis (such as 712), and attaching the second adhesive surface of the attachment member to the stationary planar support surface (such as 714), thereby securing the data storage device to the stationary planar support surface.

The attaching step of this embodiment of the present invention preferably further comprises attaching the first adhesive surface of the attachment member to the outer planar surface of the data storage device such that an outer circumference of the attachment member is positioned symmetrically about the mass axis.

The attachment member in an alternative embodiment of the method of the present invention preferably comprises an annular shaped polymeric viscoelastic double sided adhesive film (such as 214). In this alternative embodiment, the attaching step preferably further comprises attaching the first adhesive surface of the attachment member to the outer planar surface of the data storage device such that the attachment member is positioned symmetrically about the mass axis.

Another embodiment of the present invention is directed to a system for securing a disc drive (such as 100) to a stationary planar support surface (such as 212). The system of this embodiment preferably includes a disc drive having an outer planar surface (such as 104) and an attachment means (such as 214) attached to the outer planar surface of the disc drive for adhesively securing the disc drive to the stationary planar support surface.

It will be clear that the present invention is well adapted to attain the ends and advantages mentioned as well as those inherent therein. While a presently preferred embodiment

What is claimed is:

1. An apparatus for attaching a data storage device to a stationary planar support surface, wherein the data storage device has an outer housing having an outer planar surface and a storage medium within the housing rotating about a rotational axis, the device having a center-of-mass in the housing having a mass axis parallel to the rotational axis and extending through the outer planar surface, the apparatus comprising:

an attachment member having a first surface attached to the outer planar surface of the data storage device and extending around the mass axis and a second surface for fastening to the stationary planar surface.

2. The apparatus of claim 1, wherein the attachment member is positioned symmetrically around the mass axis.

3. The apparatus of claim 1, wherein the first surface of the attachment member is adhesively attached to the outer planar surface of the data storage device.

4. The apparatus of claim 1, wherein the attachment member comprises a polymeric viscoelastic double sided adhesive film.

5. The apparatus of claim 1, wherein the attachment member includes a thickness between the first surface and second surface of between 0.001 inches to 0.050 inches.

6. The apparatus of claim 1, wherein the data storage device is a disc drive and the stationary planar support surface is a computer housing.

7. The apparatus of claim 1, wherein the data storage device includes a top cover, wherein the outer planar surface is located on the top cover, wherein the attachment member comprises a polymeric viscoelastic double sided adhesive film, the first surface comprising one of the sides of the double sided adhesive film.

8. The apparatus of claim 1, wherein the data storage device is a disc drive having a top cover, the outer planar surface being located on the top cover, wherein the attachment member comprises an annular shaped polymeric viscoelastic double sided adhesive film positioned symmetrically about the mass axis and having a thickness between the two sides of between 0.001 inches to 0.050 inches.

9. The apparatus of claim 1, wherein the attachment member includes a damping means for damping shearing forces in the attachment member.

10. The apparatus of claim 1, wherein the attachment member includes a polymeric viscoelastic damping means for damping shearing forces in the attachment member.

11. The apparatus of claim 2, wherein the attachment member has a circular outer circumference positioned substantially symmetrically about the mass axis.

12. The apparatus of claim 2, wherein the attachment member has an annular shape having an outer circumference positioned substantially symmetrically about the mass axis.

13. The apparatus of claim 2, wherein the attachment member comprises a damping material having viscoelastic properties.

14. The apparatus of claim 2, wherein the attachment member comprises a viscoelastic tape.

15. The apparatus of claim 11, wherein the attachment member is annular in shape and positioned symmetrically about the mass axis.

16. A method for securing a data storage device to a stationary planar support surface using an attachment member having a first adhesive surface and a second adhesive surface, wherein the data storage device has an outer housing having an outer planar surface and a storage medium within the housing rotating about a rotational axis, the device having a center-of-mass in the housing having a mass axis parallel to the rotational axis and extending through the outer planar surface, the method comprising steps of:

(a) determining the center-of-mass of the data storage device;

(b) attaching the first adhesive surface of the attachment member to the outer planar surface of the data storage device such that the attachment member extends around the mass axis; and (c) attaching the second adhesive surface of the attachment member to the stationary planar support surface, thereby securing the data storage device to the stationary planar support surface.

17. The method of claim 16, wherein the attaching step (b) further comprises attaching the first adhesive surface of the attachment member to the outer planar surface of the data storage device such that an outer circumference of the attachment member is positioned symmetrically about the mass axis.

18. The method of claim 16, wherein the attachment member comprises annular shaped polymeric viscoelastic double sided adhesive film, and wherein the attaching step (b) further comprises attaching the first adhesive surface of the attachment member to the outer planar surface of the data storage device such that the attachment member is positioned symmetrically about the mass axis.

19. The method of claim 16, wherein the attaching step (b) further comprises cleaning the outer planar surface before attaching the first adhesive surface of the attachment member to the outer planar surface of the data storage.

20. A system for securing a disc drive to a stationary planar support surface, comprising:

a disc drive having a center-of-mass, an outer planar surface and a mass axis extending through the outer planar surface; and an attachment means attached to the outer planar surface over the center-of-mass for adhesively securing the disc drive to the stationary planar support surface.

21. The system of claim 20, wherein the attachment means is annular in shape.

22. The system of claim 20, wherein the attachment means includes a damping means for damping shearing forces in the attachment means.

23. A system for securing a disc drive to a stationary planar support surface, comprising:

a disc drive having an outer planar surface and a center-of-mass having a mass axis extending through the outer planar surface; and an attachment means attached to the outer planar surface for adhesively securing the disc drive to the stationary planar support surface wherein the attachment means includes an outer circumference extending around the mass axis.

24. The system of claim 23, wherein the attachment means is adhesively attached to the planar surface.

25. The system of claim 23, wherein the outer circumference of the attachment means is substantially circular shape.

* * * * *

UNITED STATES PATENT AND TRADEMARK OFFICE
CERTIFICATE OF CORRECTION

PATENT NO. : 6,574,099 B2
DATED : June 3, 2003
INVENTOR(S) : Lindrose

It is certified that error appears in the above-identified patent and that said Letters Patent is hereby corrected as shown below:

Column 11,
Line 63, replace "11" with -- 7 --.

Signed and Sealed this

Twenty-fifth Day of November, 2003

JAMES E. ROGAN
*Director of the United States Patent and Trademark Office*